Jan. 12, 1937.  J. D. MADDEN  2,067,640
STABILIZER
Filed Jan. 28, 1933   2 Sheets-Sheet 1
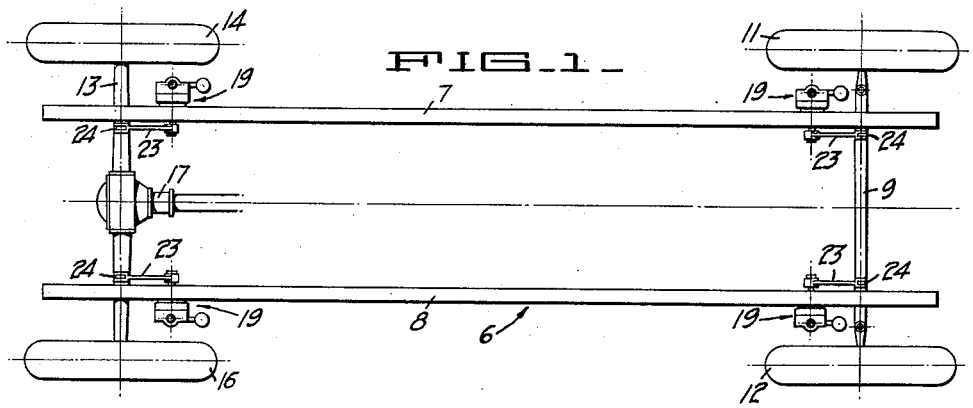
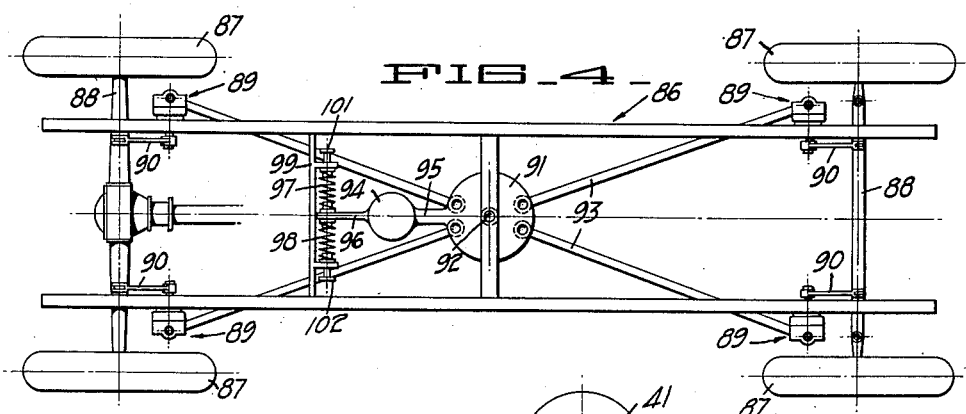
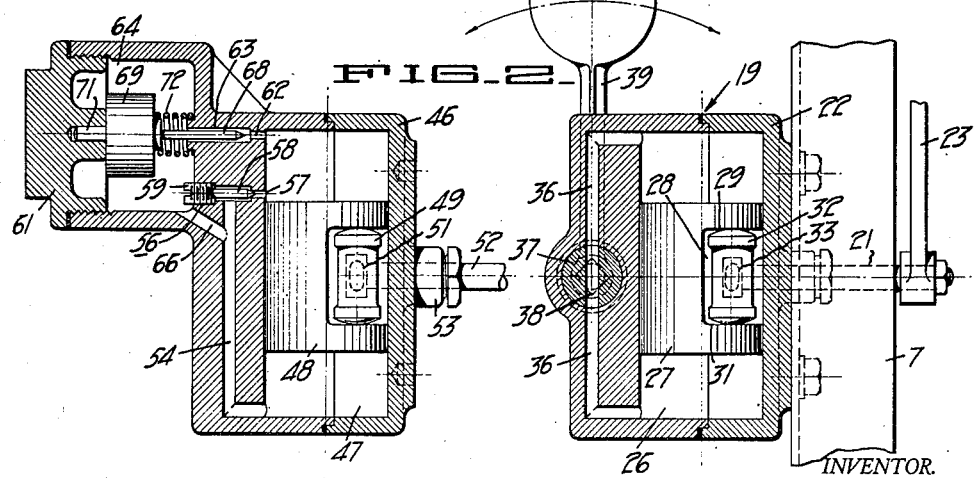
INVENTOR.
Joseph D. Madden
BY
White, Prost, Flehr & Lothrop
ATTORNEYS.

Jan. 12, 1937.  J. D. MADDEN  2,067,640
STABILIZER
Filed Jan. 28, 1933  2 Sheets-Sheet 2
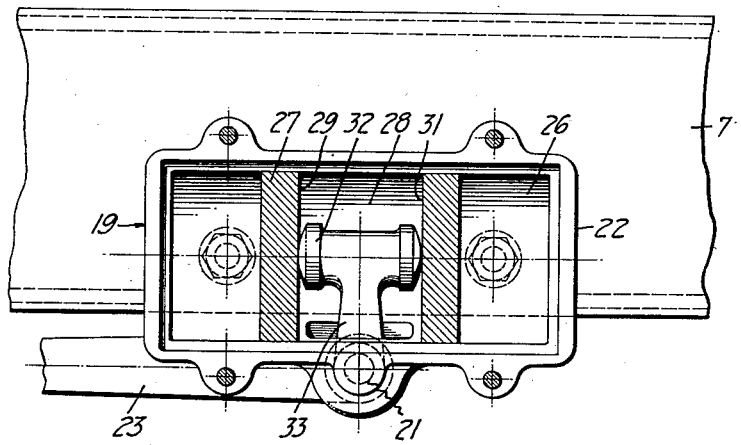
FIG_5_
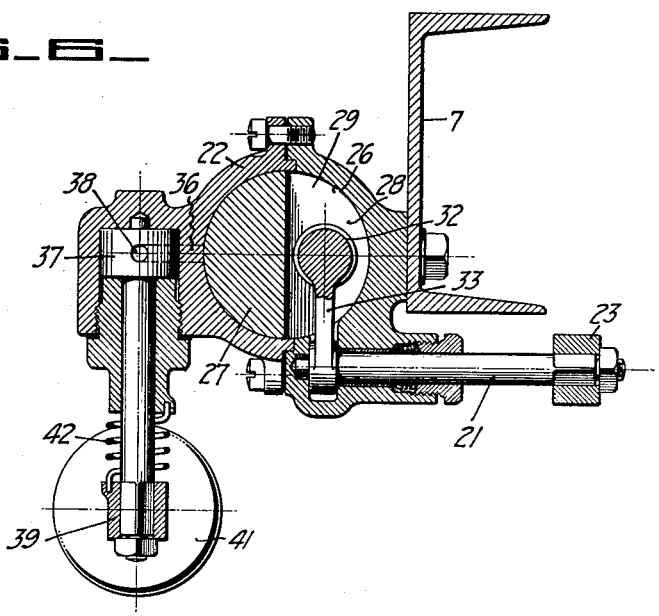
FIG_6_
INVENTOR
Joseph D. Madden
BY
White, Prost, Fehr & Lothrop
ATTORNEYS Patented Jan. 12, 1937

2,067,640

UNITED STATES PATENT OFFICE 2,067,640

STABILIZER

Joseph D. Madden, Oakland, Calif.

Application January 28, 1933, Serial No. 653,936

1 Claim. (Cl. 267—11)

My invention relates to means for resisting unwarranted movement between two relatively movable bodies and is especially concerned with means applicable to automotive vehicles for arresting and inhibiting undesired movement thereof.

An object of my invention is to provide a stabilizer for damping or precluding side-sway of a vehicle, particularly when the vehicle is rounding curves.

Another object of my invention is to provide a means for preventing tipping or side-sway of a vehicle for both directions of turning of the vehicle.

Another object of my invention is to provide a stabilizing mechanism which requires but little change of existing equipment or which can easily be adapted to present-day vehicles.

Another object of my invention is to provide a stabilizer which is increasingly effective as the forces which produce the undesired movement increase.

The foregoing and other objects are attained in the embodiments of the invention shown in the drawings, in which—

Figure 1 is a plan of a vehicle equipped with the stabilizer of my invention, the showing being semi-diagrammatic.

Figure 2 is a cross-section on a central, horizontal plane of one of the stabilizing mechanisms of my invention shown in Figure 1.

Figure 3 is a cross-section of a modified form of stabilizer mechanism.

Figure 4 is a diagrammatic showing of a vehicle in plan with a modified form of the stabilizer of my invention applied thereto.

Figure 5 is a cross section on a longitudinal vertical plane of the stabilizing mechanism of Figure 2.

Figure 6 is a cross section on a transverse vertical plane of the stabilizing mechanism of Figure 2.

In its preferred form the stabilizer of my invention comprises a connection between relatively moving portions of a mechanism such as a vehicle, the connection including a means responsive to forces which ordinarily produce a sidesway or tipping of the mechanism, for interposing a resistance to tipping forces which produce the side-sway.

In the form of my invention particularly disclosed in Figures 1 and 2, there is provided a standard vehicle frame 6 having side members 7 and 8 which are supported movably with respect to a front axle 9 having ground-engaging wheels 11 and 12 at opposite extremities thereof, and supported on a rear axle 13 having ground-engaging wheels 14 and 16 at the extremities thereof. The wheels 11 and 12 are preferably dirigible in accordance with customary practice and the wheels 14 and 16 are preferably driven by means of a drive mechanism enclosed in a housing 17 and extending from a source of power, not shown. In the operation of the vehicle over a roadway, and due to surface irregularities but promarily due to variations in direction from a straight course, the frame 6 tends to be tipped or canted with regard to the axles 9 and 13. The forces involved act transversely of the frame 6, in general, and tend to cause the frame side member on the outside of the curve to approach the axles 9 and 13 and the frame side member on the inside of the curve to recede from the axles 9 and 13.

In accordance with my invention therefore, I provide stabilizing mechanisms, generally designated 19, at appropriate points of the frame 6. Each of the stabilizing mechanisms is provided with a central shaft 21 which is rotatable in a liquid-tight casing 22 fastened to the adjacent side member 7 or 8. At its extremity the shaft 21 is provided with an arm 23 extending to a connection or articulation 24 joining the arm to the adjacent axle 9 or 13. Since the casing 22 is fastened to the frame 6, and since the arm 23 is connected to an adjacent axle, relative movement between the frame and axle is productive of movement of the arm 23 and correspondingly of a proportional rotation of the shaft 21.

As shown in Figure 2, the casing 22 is preferably provided with a generally cylindrical bore or chamber 26 within which the piston 27 is adapted to reciprocate. The piston is preferably recessed as at 28 to provide a pair of opposing faces 29 and 31 against which a partially spherical head 32 abuts. The head is mounted at the extremity of an arm 33 extending radially from the shaft 21, so that upon rotation or movement of the shaft 21 the head 32 moves generally longitudinally of the chamber 26 and in a slight arc. The head being in contact with the piston 27 causes the piston to reciprocate in the chamber 26 in accordance with the movement of the shaft 21. Preferably the chamber 26 is filled with liquid or comparable fluid customary for use in shock-absorbers, and I preferably provide a path for establishing a more or less restricted communication between opposite sides of the chamber 26 or ends of the piston 27. For this reason the casing 22 is formed with a passage 36 so that movement of the piston 27 in either direction causes a corresponding fluid flow through the passage 36.

In accordance with my invention, I preferably interpose a variable restriction in the passage 36 in order to inhibit the movement of the piston in the chamber 26 and, correspondingly, the relative movement between the associated frame side member and the axle in accordance with a deleterious displacing force. To this end the casing 22 is provided with a transverse bore the axis of which is substantially vertical and within which is seated a plug cock 37 having a diametral passage 38 therethrough adapted in one position of the cock to register with the passage 36 and in successive positions to increase the restriction through the passage 36 and finally to block flow therethrough entirely. The plug cock 37 forms the rotary axle of an arm 39 extending horizontally and exteriorly of the casing and terminating in a ball 41 or other convenient mass.

As particularly disclosed in Figure 1, preferably the ball 41 is situated in longitudinal alignment with the axis of the plug cock 37 during normal forward and rearward progress of the vehicle and is normally maintained in such position by a spring 42. When the vehicle deviates in either direction from a straight course, there is effective upon the mass 41 a transverse component tending to cause the mass to follow with the main frame 6 of the vehicle. However, the mass of the ball 41 is such that the ball tends to remain in its original course while the vehicle as a whole deviates therefrom. This in effect causes a rotation of the plug cock 37 and restricts flow through the passage 36, thereby damping the movement of the piston 27. In the event the passage 36 is closed entirely, the piston 27 is held virtually immovable in the chamber 26 and the arm 23 and its connection 24 to the axle precludes any sensible movement between the axle and the associated frame side-member. Since the mass 41 is normally in an intermediate position because of the spring 42, a deviation of the vehicle from a straight path in either direction causes an equivalent displacement of the mass 41 and a corresponding throttling of the fluid flow through the passage 36 and a consequent and proportional resistance to side-sway or tipping due to the deviation from a straight path. The mass 41 is therefore always lagging behind the forces which tend to cause the vehicle to depart from its normal direction of motion and at these times to interpose a resistance between the frame and the axle to preclude tipping or side-sway of the frame with respect to the axle. As shown in Figure 1, I preferably provide one of the stabilizers 19 adjacent each of the wheels of the vehicle, in order that the stabilizers can be relatively small and still be completely effective and so that the stabilizers adjacent the outside of the curve tend to prevent the frame side members from approaching the axles 9 and 13, while the stabilizers adjacent the inside of the curve tend to prevent the frame side members from receding from the axles 9 and 13.

In Figure 3, I disclose a modified arrangement in which there is no necessity for an external mass 41 and which can be applied to a standard shock-absorber of the hydraulic type, such as are now provided for automobile equipment. In this form of the device, a casing 46 is adapted to be bolted to the vehicle frame and includes a cylindrical chamber 47. Within the cylinder there is adapted to reciprocate a piston 48 which is actuated by a partially spherical head 49 mounted at the end of a radial arm 51 secured to a shaft 52 passing out through the casing and packed by a stuffing gland 53. The shaft 52 is connected by an arm, not shown, but similar to the arm 23, to the axle of the vehicle. Opposite ends of the chamber 47 are placed in communication through a passage 54 in which there is a variable restriction 56. The restriction comprises an orifice 57 in which is adapted to operate a needle valve 58 provided on a threaded stem 59 engaging the casing 46. A removable plug 61 affords access to the stem 59 for purposes of adjustment.

In parallel with the orifice 57 is a comparable orifice 62 leading into a passage 63 communicating with a chamber 64. A duct 66 joins the passage 54 and the chamber 64, so that fluid flowing through from the chamber 47 through the orifice 62 and the passage 63 into the chamber 64 can also flow through the duct 66 and the passage 54 into the other end of the chamber 47. To govern flow through the orifice 62 I preferably provide a needle 68 on which there is mounted a weight 69. While this valve is of the unbalanced type, I can utilize a balanced valve such as is shown in Figure 2. The weight or mass 69 is provided with a projection 71 which in effect is a continuation of the valve stem 68 and is guided in the cap 61. The weight 69 is in abutment with a coil spring 72 interposed between the weight 69 and the wall of the casing 46.

In the operation of this form of the device, when the vehicle is proceeding in a straight path the piston 48 reciprocates in the chamber 47 and liquid contained in the casing 46 is transferred from one end of the chamber 47 to the other, through the passage 54 and through both of the orifices 62 and 57, so that the adjustment 59 is effective to control the normal functioning of the device as a damping shock-absorber. When the vehicle deviates from its normal, straight course, the weight 69 is acted upon and if it is urged to move toward the left in Figure 3 such urgency is not effective inasmuch as the weight is in abutment with the cap 61. However, in the event the urgency is in the opposite direction, or toward the right, the weight 69 tends to move toward the right in Figure 3 against the resistance of the spring 72 and to close the orifice 62, thereby causing greater resistance to movement of the piston 48 and opposing the unbalancing force tending to tip the frame of the car with regard to the axle. With this form of the device I preferably install stabilizers such as shown in Figure 3 on opposite sides of the frame as indicated in Figure 1 and with reverse symmetry. That is, the weight 69 in the left-hand stabilizer, for instance, is ineffective when the car turns a corner to the left but is effective when the car turns a corner to the right, and, oppositely, the stabilizer on the right-hand side of the vehicle is ineffective when the car turns to the right but is, however, effective when the car turns to the left.

As a further modified form of this invention, I have illustrated in Figure 4 a vehicle having a frame 86 supported on ground-engaging wheels 87 through the medium of axles 88 and interposed springs, not shown, in the customary fashion. Adjacent each wheel 87 there is provided a stabilizing device 89 connected to the frame 86 and to the adjacent axle 88 by an interposed linkage 90 of the type heretofore described. These stabilizers are preferably of the character shown in Figure 1, but instead of having the plug cocks 37 each provided with an individual weight such as 41, I preferably connect each of the plug cocks to a central plate 91 rotatably mounted as 75 at 92 on the frame 86. The connection between the plug cocks and the plate 91 is preferably by a diagrammatically illustrated linkage 93 which can include short levers on the plug valves 37 so that movement of the plate 91 simultaneously is effective to operate all of the plug cocks 37.

In order to move the plate 91 I preferably affix thereto an extension 95 which is provided with a weight or mass 94, so that upon deviation of the frame 86 from a given course the weight 94 responds to the deviation and through the links 93 actuates the restrictions in the stabilizers 89, thereby affording increased resistance to the disturbing force. If desired, the weight 94 can be provided with an extension 96 interposed between a pair of oppositely arranged coil springs 97 and 98, respectively, which are provided in a mounting 99 affixed to the frame and having therein adjusting screws 101 and 102, respectively. The springs 97 and 98 can be variously adjusted to interpose more resistance in one direction than the other, or can be adjusted equivalent amounts to provide a damping action on the movement of the mass 94. If desired, of course, the weight 94 can be located adjacent to the driver of the vehicle so as to be subject to manual operation, and, furthermore, the adjustments 101 and 102 can likewise be placed in a location convenient to the driver for adjustment during the travel of the vehicle.

In all forms of the device of my invention disclosed herein, there is provided a means automatically responsive to a disturbing force arising when the vehicle deviates from its normal course, to interpose a sufficient resistance between the frame and the ground-engaging wheels of the vehicle to reduce or preclude tipping of the frame with respect to the axles or ground-engaging wheels of the vehicle.

I claim:

A vehicle stabilizer comprising a hydraulic device adapted to be installed on a vehicle, said device having therein a passage for hydraulic flow, a weight located entirely within said passage and adapted to move in response to deviations of said vehicle from a straight path for restricting said passage, and a spring disposed within said passage for resisting movement of said weight.

JOSEPH D. MADDEN.